US012794788B2

(12) United States Patent
Mermoud et al.

(10) Patent No.: US 12,794,788 B2
(45) Date of Patent: Nov. 10, 2026

(54) MULTIMODAL FOUNDATION MODEL FOR NETWORKING

(71) Applicant: Cisco Technology, Inc., San Jose, CA (US)

(72) Inventors: Grégory Mermoud, Venthône (CH); Jean-Philippe Vasseur, Combloux (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 18/929,936

(22) Filed: Oct. 29, 2024

(65) Prior Publication Data

US 2026/0121939 A1 Apr. 30, 2026

(51) Int. Cl.
*G06F 15/173* (2006.01)
*H04L 41/16* (2022.01)

(52) U.S. Cl.
CPC .................................... *H04L 41/16* (2013.01)

(58) Field of Classification Search
CPC ....................................................... H04L 41/16
See application file for complete search history.

(56) References Cited

U.S. PATENT DOCUMENTS 11,415,425 B1 8/2022 Merchant et al.
2021/0150315 A1 5/2021 Dang et al.
2021/0152440 A1 5/2021 Fenoglio et al.
2021/0176120 A1* 6/2021 Soon-Shiong ........ H04L 41/069
2021/0185059 A1* 6/2021 Achleitner ............ G06F 16/355
2022/0377000 A1 11/2022 Musa
2023/0061280 A1* 3/2023 Rohrkemper .......... G06N 20/00
2025/0310204 A1* 10/2025 Dhanakshirur ......... H04L 41/16

FOREIGN PATENT DOCUMENTS

CN 116545871 A 8/2023

OTHER PUBLICATIONS

Jiang Y., et al., "Many-Shot In-Context Learning in Multimodal Foundation Models", arXiv:2405.09798v1 [cs.LG], May 16, 2024, pp. 1-16.
Li C., et al., "Multimodal Foundation Models: From Specialists to General-Purpose Assistants", arXiv:2309.10020v1 [cs.CV], Sep. 18, 2023, pp. 1-119.
Mizrahi D., et al., "4M: Massively Multimodal Masked Modeling", 37th Conference on Neural Information Processing Systems (NeurIPS 2023), arXiv:2312.06647v1 [cs.CV], Dec. 11, 2023, pp. 1-46.

* cited by examiner

*Primary Examiner* — Padma Mundur
(74) *Attorney, Agent, or Firm* — Merchant & Gould P.C.; Kenneth J. Heywood

(57) ABSTRACT

In one implementation, a device obtains sets of network data having different modalities that are generated by a plurality of data sources in a computer network regarding operation of the computer network. The device configures a plurality of tokenizers to tokenize the sets of network data, each tokenizer being configured for a different one of the different modalities of the sets of network data. The device trains, using the plurality of tokenizers, a multimodal foundation model to make a cross-modality prediction. The device provides the multimodal foundation model for use to assess the operation of the computer network.

20 Claims, 8 Drawing Sheets

MULTIMODAL FOUNDATION MODEL FOR NETWORKING

TECHNICAL FIELD

The present disclosure relates generally to network troubleshooting and, more particularly, to a multimodal foundation model for networking.

BACKGROUND

As the number of devices, services, and communication mechanisms in a computer network continues to increase, so too does the complexity of the network. This complexity also makes detecting and troubleshooting issues in the network difficult. For instance, poor application performance during a video conference could be attributable to a lack of resources on the endpoint device of a participant in the video conference, to poor network performance (e.g., high packet loss, latency, etc.), or to even problems associated with the application itself (e.g., an overloaded server, etc.).

In recent years, artificial intelligence (AI)/machine learning (ML) has proven itself to be able to assess large amount of data and make inferences about that data. Recently, foundation models, also known as foundational models, have emerged. In general, these types of models are large-scale AI/ML models that are trained on vast amounts of data to acquire general knowledge and capabilities that can be applied to a wide range of tasks. These models may also serve as a base for developing more specialized applications through fine-tuning or adaptation. However, using a foundation model for purposes of identifying and troubleshooting issues in a computer network still remains challenging due to the disparate systems and data sources in the network.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
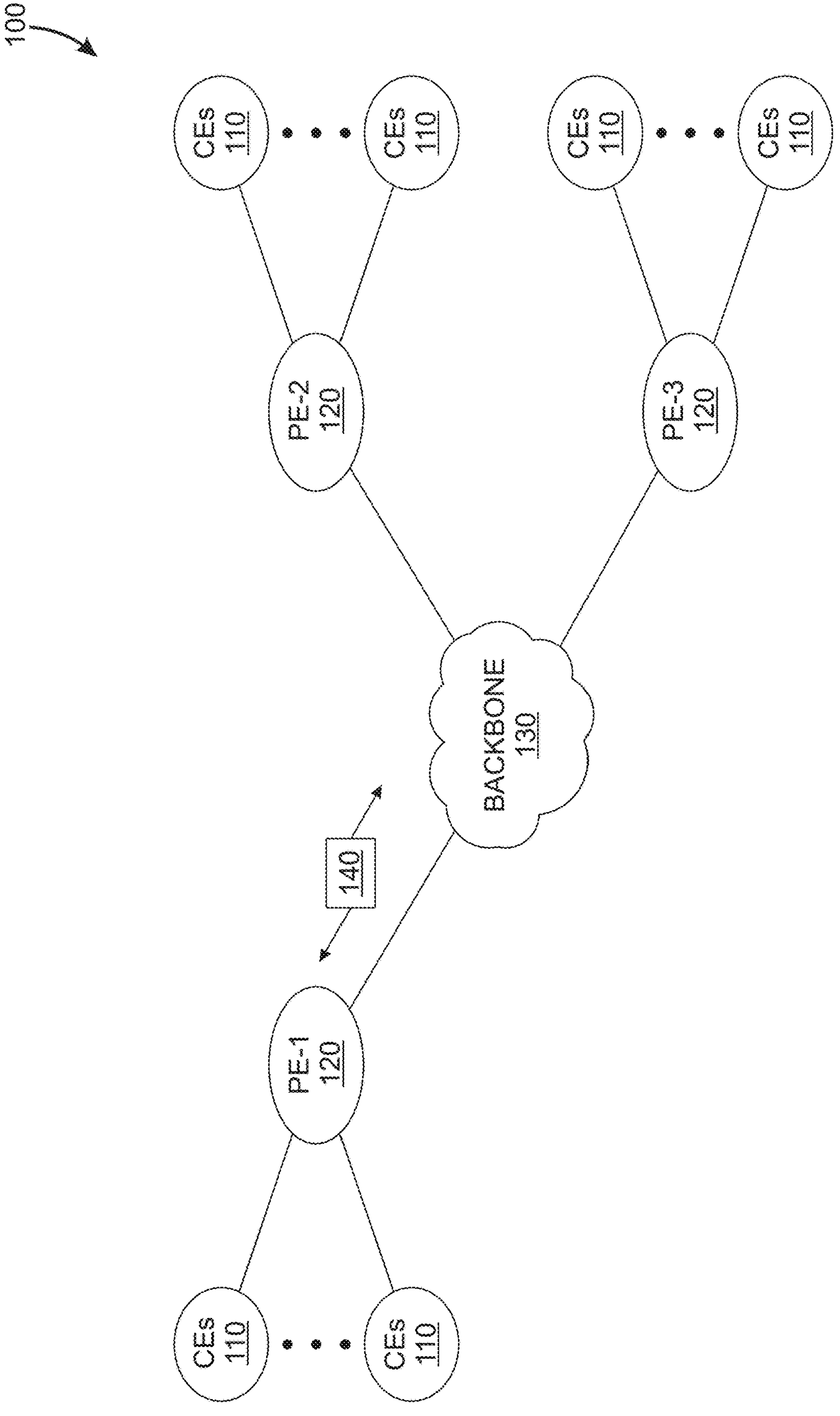
FIGS. 1A-1B illustrate an example communication network.

According to one or more implementations of the disclosure, a device obtains sets of network data having different modalities that are generated by a plurality of data sources in a computer network regarding operation of the computer network. The device configures a plurality of tokenizers to tokenize the sets of network data, each tokenizer being configured for a different one of the different modalities of the sets of network data. The device trains, using the plurality of tokenizers, a multimodal foundation model to make a cross-modality prediction. The device provides the multimodal foundation model for use to assess the operation of the computer network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
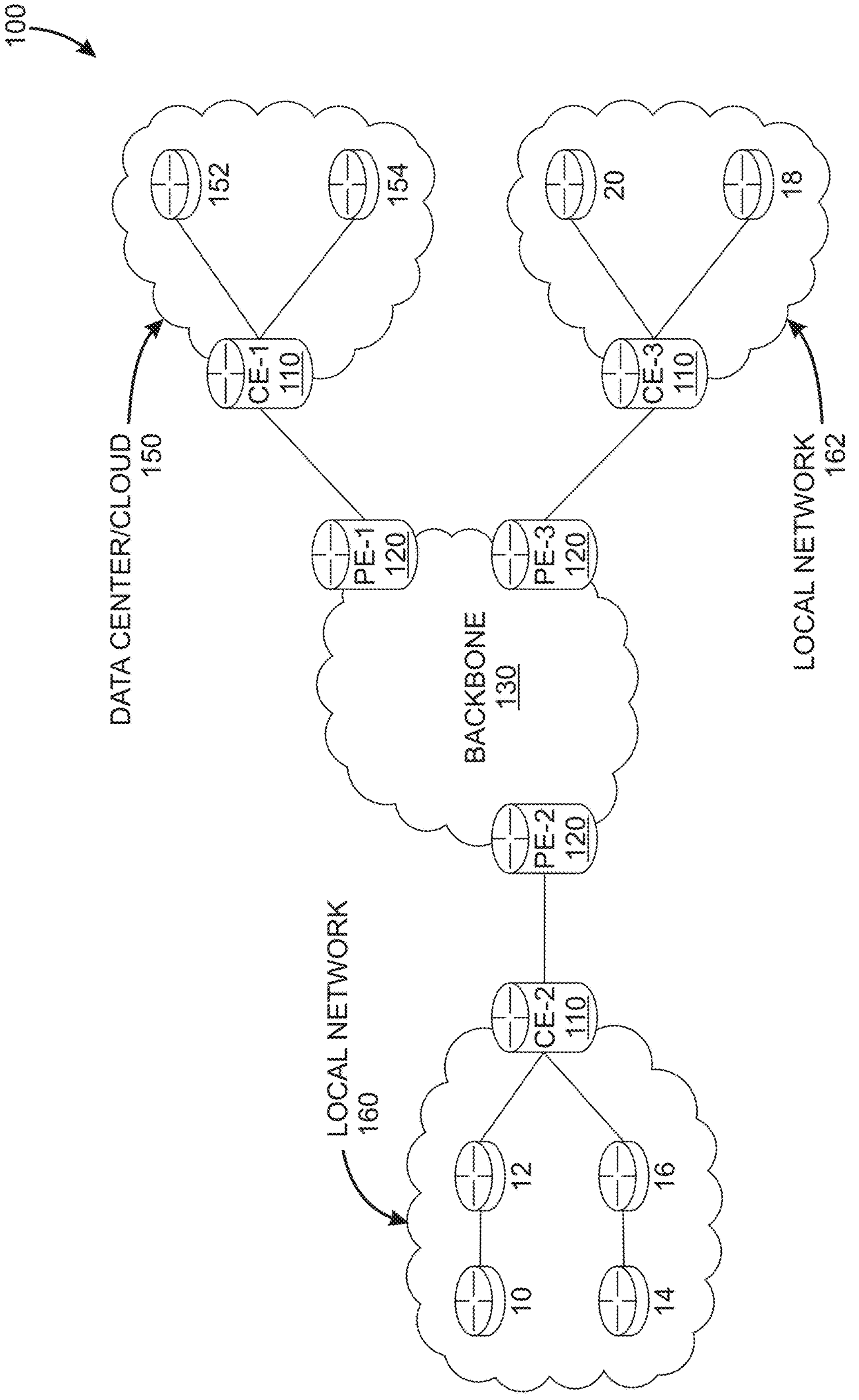

FIG. 1B illustrates an example of network 100 in greater detail, according to various implementations. As shown, network backbone 130 may provide connectivity between devices located in different geographical areas and/or different types of local networks. For example, network 100 may comprise branch/local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
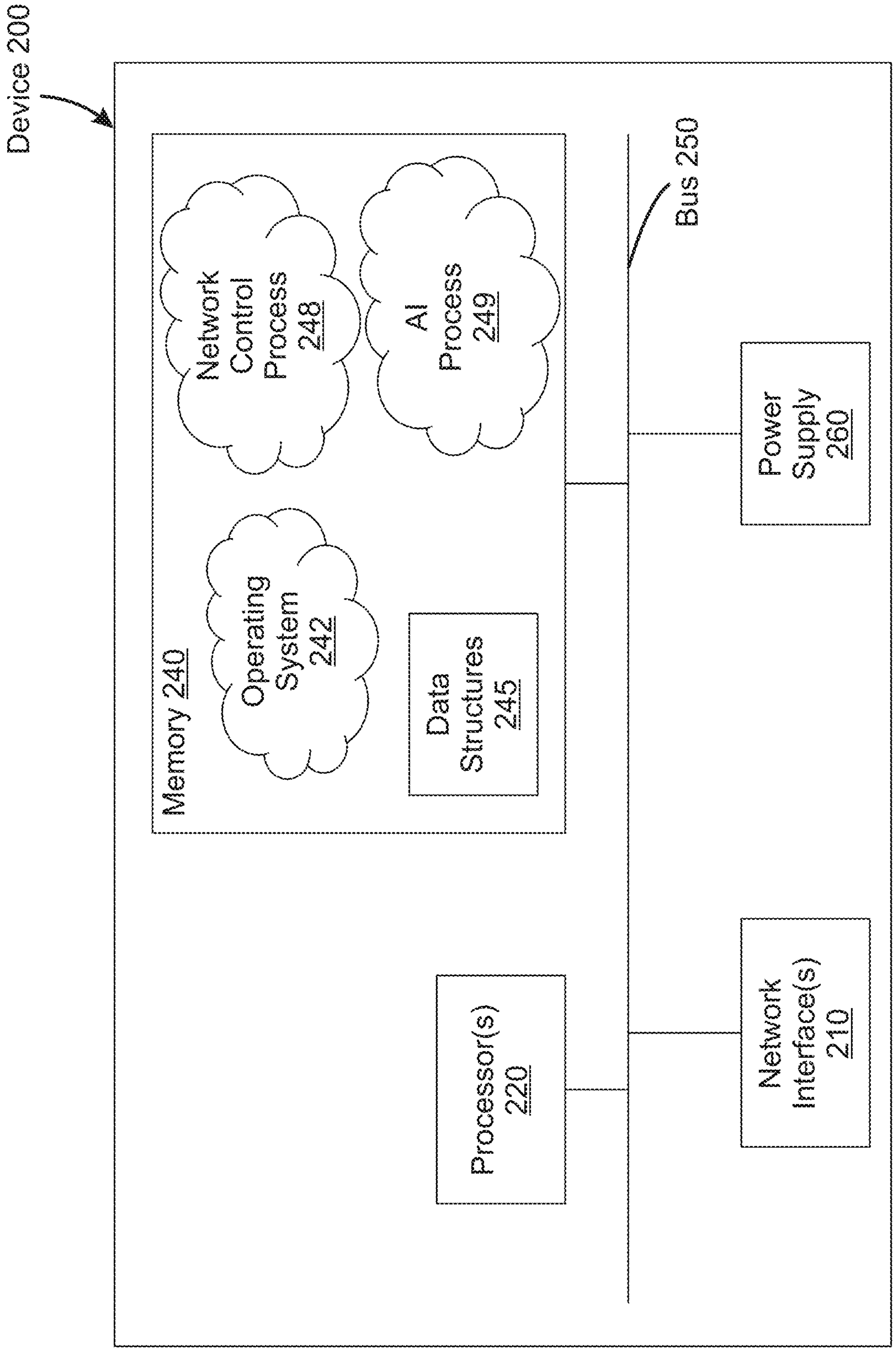
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or an AI process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or AI process 249 may include computer executable instructions that, when executed by processor(s) 220, cause device 200 to perform the techniques described herein. To do so, in some implementations, network control process 248 and/or AI process 249 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or AI process 249 may employ one or more supervised, unsupervised, or self-supervised learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques (including self-supervised techniques) that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or AI process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time-series), random forest classification, or the like.

In further implementations, network control process 248 and/or AI process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), diffusion models, other foundation models, and the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
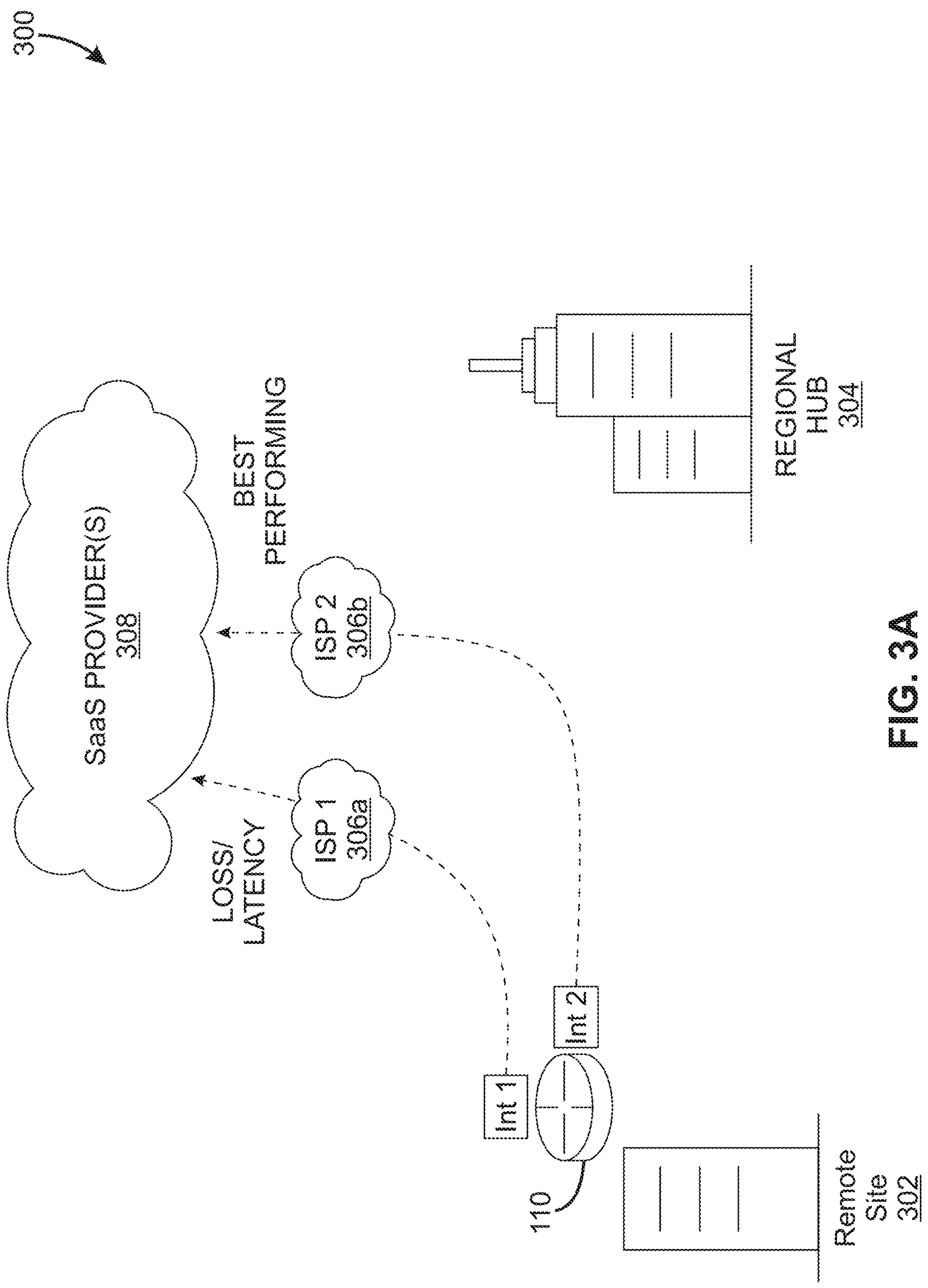
FIGS. 3A-3B illustrate example network deployments.
Figure 3B:
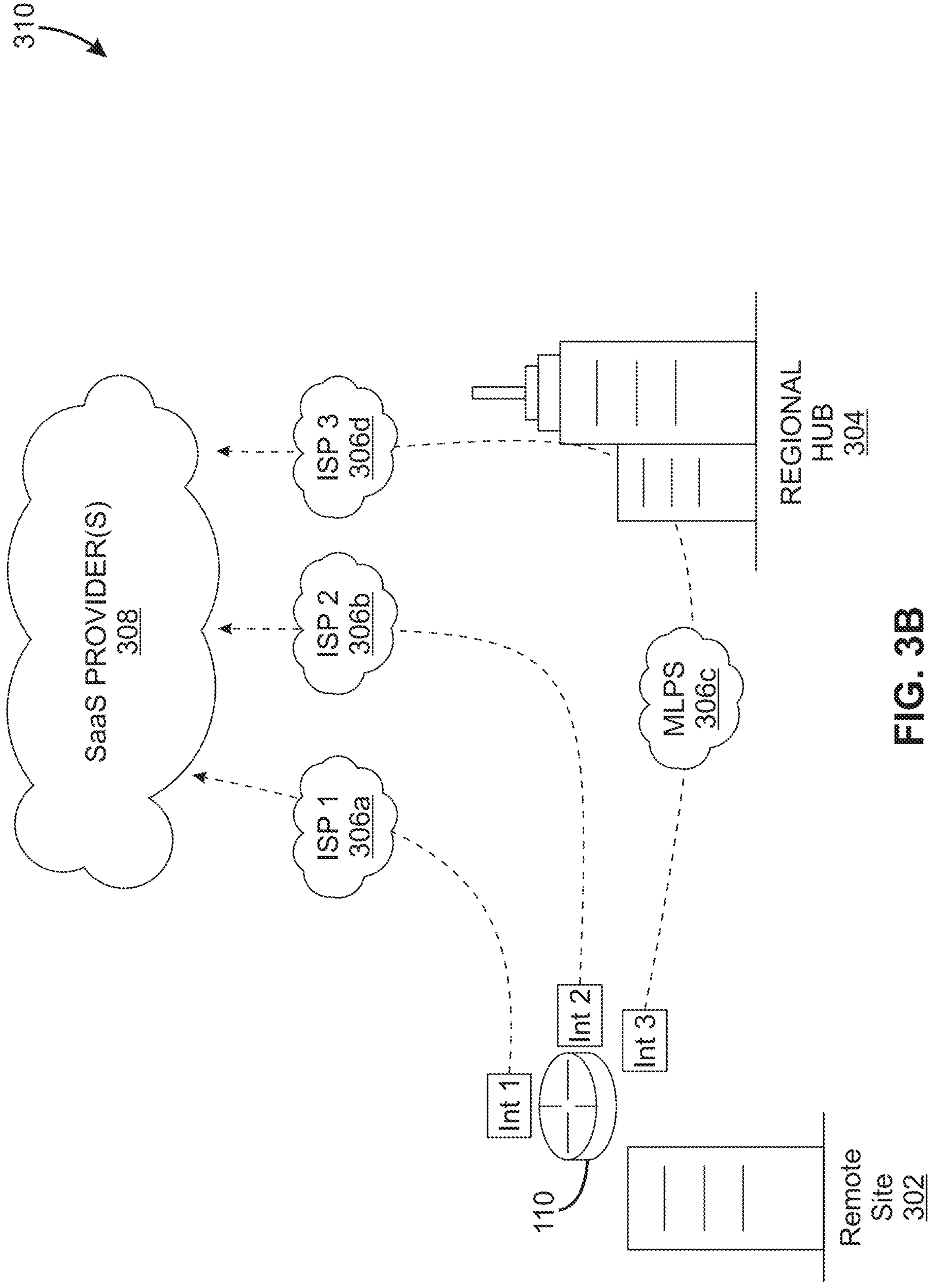

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
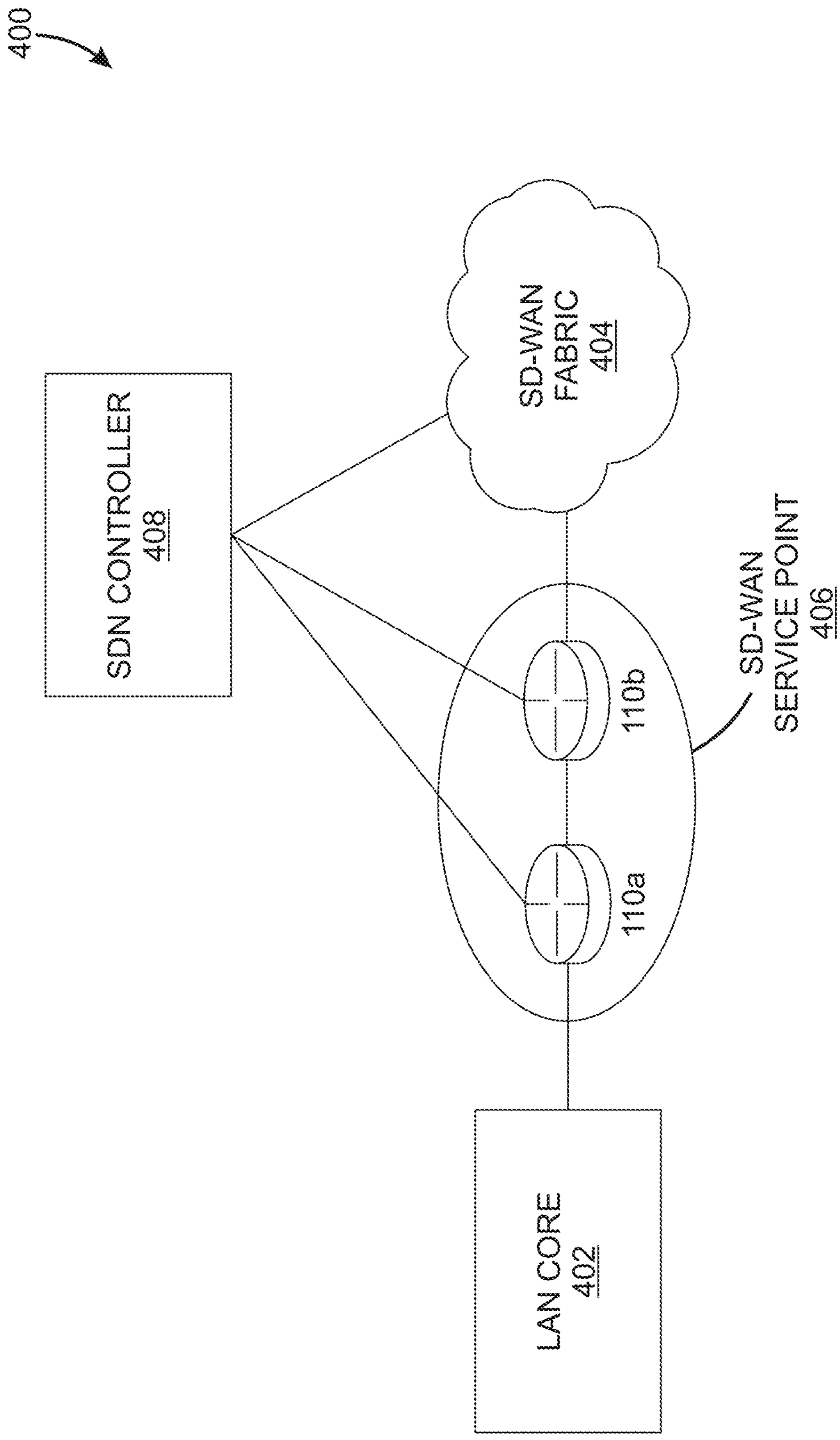
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service (e g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, as the number of devices, services, and communication mechanisms in a computer network continues to increase, so too does the complexity of the network. This complexity also makes detecting and troubleshooting issues in the network difficult. For instance, poor application performance during a video conference could be attributable to a lack of resources on the endpoint device of a participant in the video conference, to poor network performance (e.g., high packet loss, latency, etc.), or to even problems associated with the application itself (e.g., an overloaded server, etc.).

In recent years, artificial intelligence (AI)/machine learning (ML) has proven itself to be able to assess large amount of data and make inferences about that data. Recently, foundation models, also known as foundational models, have emerged. In general, these types of models are large-scale AI/ML models that are trained on vast amounts of data to acquire general knowledge and capabilities that can be applied to a wide range of tasks. These models may also serve as a base for developing more specialized applications through fine-tuning or adaptation. However, using a foundation model for purposes of identifying and troubleshooting issues in a computer network still remains challenging due to the disparate systems and data sources in the network.

Multimodal foundation models take the concept of a foundation model further by integrating multiple types of data and modalities, such as text, images, video, and audio. These models can process and understand information across different formats, enabling them to perform tasks that require combining knowledge from various sources. Key characteristics of multimodal foundation models include:

Large-scale training: They are typically trained on massive datasets, often with billions of parameters.

Self-supervised learning: Many of these models use self-supervised techniques to learn from unlabeled data.

Versatility: They can be adapted to various downstream tasks with minimal additional training.

Cross-modal understanding: Multimodal models can interpret and generate content across different modalities, such as describing images in text or generating images from text prompts.

Improved performance: By leveraging multiple modalities, these models often achieve superior results compared to unimodal approaches.

Multimodal foundation models have shown remarkable capabilities in tasks such as visual question answering, image captioning, text-to-image generation, and video understanding. They are pushing the boundaries of AI by enabling more natural and comprehensive interactions between humans and machines across various sensory inputs and outputs.

——Multimodal Foundation Model for Networking——

According to various implementations, a set of mechanisms are introduced herein that allow for the designing, training, and deployment of a multimodal foundation model specifically for networking. More specifically, the techniques herein introduce an advanced multimodal foundational model trained from a diverse set of networking multimodal data such as network topologies, configurations, traffic statistics, packet captures, time-series data, firewall logs, and/or global metrics, to name a few. The techniques use self-supervised learning to train a multimodal foundational model that captures the relation among these modalities, thereby allowing it to predict and understand complex network behaviors. The resulting model can then be fine-tuned via transfer learning to perform networking tasks such as anomaly detection, traffic classification, performance optimization, etc.

Illustratively, the techniques described herein may be performed by hardware, software, and/or firmware, such as in accordance with AI process 249, which may include computer executable instructions executed by the processor 220 (or independent processor of interfaces 210) to perform functions relating to the techniques described herein, such as in conjunction with network control process 248.

Specifically, according to various implementations, a device obtains sets of network data having different modalities that are generated by a plurality of data sources in a computer network regarding operation of the computer network. The device configures a plurality of tokenizers to tokenize the sets of network data, each tokenizer being configured for a different one of the different modalities of the sets of network data. The device trains, using the plurality of tokenizers, a multimodal foundation model to make a cross-modality prediction. The device provides the multimodal foundation model for use to assess the operation of the computer network.

Figure 5:
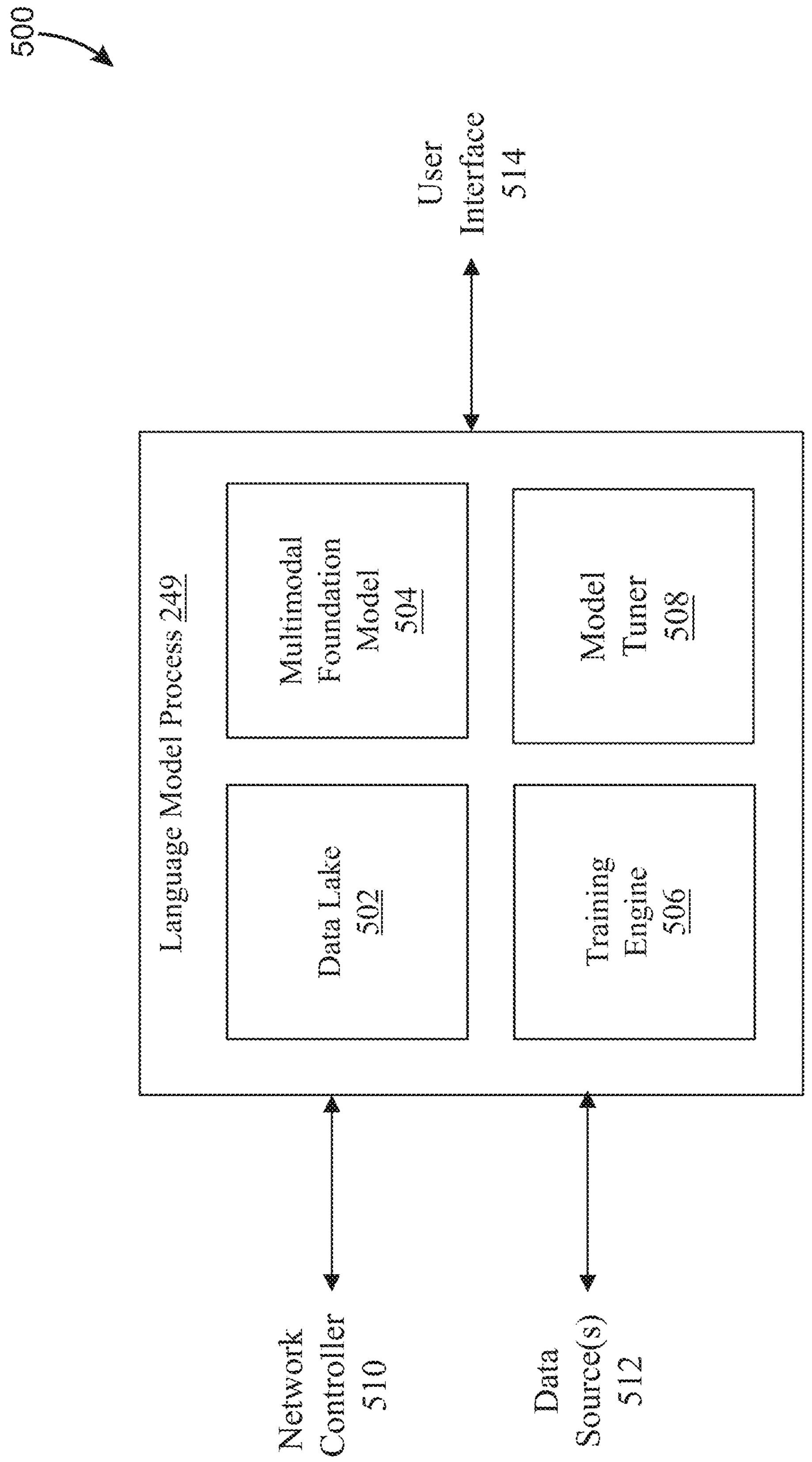
FIG. 5 illustrates an example architecture for using a multimodal foundation model for networking.

FIG. 5 illustrates an example architecture for using a multimodal foundation model for networking, according to various implementations. At the core of architecture 500 is AI process 249, which may be executed by a controller for a network or another device in communication therewith. For instance, AI process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, AI process 249 may interface with a network controller 510 (e.g., network control process 248), either locally or via a network, such as via one or more application programming interfaces (APIs), etc. In addition, AI process 249 may communicate with any number of user interfaces, such as user interface 514.

As shown, AI process 249 may include any or all of the following components: a datalake 502, a multimodal foundation model 504, a training engine 506, and/or a model tuner 508. As would be appreciated, the functionalities of these components may be combined or omitted, as desired. In addition, these components may be implemented on a singular device or in a distributed manner, in which case the combination of executing devices can be viewed as their own singular device for purposes of executing AI process 249.

In various implementations, datalake 502 may take the form of a large-scale datalake or data lakehouse which hosts networking data from one or more data sources 512 and across multiple modalities such as any or all of the following:

- Network topologies that represent devices, clients, and servers, and their topology at multiple levels (physical, link, overlays). In some implementations, this data may take the form of complex graph pictures.
- Network configurations of devices in the network, such as firewalls, DNS servers, or other key infrastructure components.
- Traffic statistics coming from IPFIX or Netflow data, measured at various points of the network. This may also include traffic data from extensions such as Application Response Time (ART) and Network-Based Application Recognition (NBAR).
- Packet captures, even if sparse in nature, in the form of opportunistic or targeted capture sessions and stored as PCAP files.
- Time-series data that represent network metrics (ICMP probes, interface statistics, CPU, memory, etc.) for different devices and endpoints.
- Firewall data such as connection and session counts, policy violation counts, allowed and blocked requests, rule hit counts.
- Event logs coming from any device or endpoint. This may include events such as configuration changes, software updates, alerts, etc.
- Global metrics such as the availability, throughput, and health score of different devices, as well as the entire network, when available. In some implementations, this may include ratings from end users, such as by asking a user via a chatbot or other mechanism to According to various implementations, multimodal foundation model 504 may include multiple sub-blocks, each adapted to the specific modality that is being considered. For instance, multimodal foundation model 504 may unify the output of each modality block by mapping all input data to sequences or sets of discrete tokens, which are computed by modality-specific tokenizers (e.g., a tokenizer that tokenizes PCAP files, etc.). This approach allows multimodal foundation model 504 to map every modality to any other which, in turn, is important to train the model using a self-supervised approach.

The training of multimodal foundation model 504 may rely+ on a few core assumptions, which must be met by the first component, that is, the repository of training data:

1. Different data modalities are 'in relation': it means that one must be able to relate a PCAP file with the specific portion of loss, latency, jitter time-series that corresponds to it, both in time and in 'space' (e.g., the PCAP file has been captured along the same network path as measured by the loss, latency, jitter time-series).
2. Data modalities are standardized, that is, similar units, aggregation windows, and measurement strategies are used across the dataset for the same type of modality. For instance, packet loss may be represented as an integer in the [0, 100] interval, measured as the fraction of lost packets over a 1-minute interval.
3. Missing data is explicitly marked: e.g., a 'MISSING' token may be used whenever data for a given modality is not available. In some implementations, other tokens such as 'DIRTY' or 'REMOVED' can be used to denote data that has been dropped because it is unreliable, inconsistent, or unavailable for legal or operational reasons.

Training engine 506 may be responsible for computing the model weights of multimodal foundation model 504, in various implementations. More specifically, training engine 506 may train modality-specific tokenizers separately on each modality, and then use them to train the overall multimodal model (i.e., multimodal foundation model 504). The training strategy for multimodal foundation model 504 may take the form of a self-supervised input and target masking, whereby training engine 506 randomly picks some input modalities and subset of their tokens and ask the model to predict the remaining output modalities that correspond to this input (hence the criticality of point 1 above). This pre-training strategy leads to a model that learns the relationship between all modalities, as its loss captures its ability to predict packet captures from traffic statistics, or CPU load from event logs, or any other pair of modalities that the model captures, etc.

In various implementations, model tuner 508 take multimodal foundation model 504 as input and transfers it to common tasks found in networking by fine-tuning a subset of the model on relevant data. Example of potential tasks that the model can be transferred to may include, but are not limited to, any or all of the following:

- Anomaly Detection and Intrusion Detection: Identify unusual patterns or potential security threats based on deviations in network traffic, packet captures, firewall data, and event logs.
- Network Traffic Classification and Prediction: Classify network traffic by application or service using Netflow/IPFIX data, ART, and NBAR, and predict future traffic patterns to aid in capacity planning.
- Performance Monitoring and Optimization: Analyze time-series data to monitor performance metrics such as ICMP probes, interface statistics, CPU, and memory usage, and optimize network configurations accordingly.
- Root Cause Analysis for Network Issues: Perform root cause analysis for network issues by correlating data from different modalities like packet captures, event logs, and firewall data to pinpoint the source of the problem.
- Predictive Maintenance and Failure Prediction: Predict potential device failures or network issues by analyzing historical time-series data and event logs to schedule maintenance proactively.
- Policy Compliance and Violation Detection: Detect policy violations and ensure compliance with network security policies by analyzing firewall data and event logs.
- QoS and SLA Assurance: Ensure Quality of Service (QoS) and Service Level Agreement (SLA) compliance by analyzing global metrics such as availability, throughput, health scores, and end-user ratings.

Capacity Planning and Resource Allocation: Plan network capacity and allocate resources efficiently based on the analysis of traffic statistics, packet captures, and global network metrics.

Alerting and Automated Response: Develop automated alerting systems and response mechanisms for critical network events by leveraging real-time event logs and firewall data.

User Experience Monitoring: Monitor and improve user experience by analyzing application response times, network-based application recognition data, and end-user ratings.

Security Policy Optimization: Optimize firewall and security policies by analyzing connection and session counts, policy violation counts, and rule hit counts.

Network Configuration Management: Manage and validate network configurations by analyzing event logs related to configuration changes and software updates.

Incident Response and Forensics: Perform detailed incident response and forensic analysis using packet captures, event logs, and firewall data to investigate and resolve security incidents.

Network Health and Performance Dashboards: Create comprehensive dashboards that integrate various metrics and data sources to provide a holistic view of network health and performance.

To achieve this, model tuner 508 may modify the architecture of multimodal foundation model 504 to retain only the relevant modalities for the task, and it is then fine-tuned on task-specific data in a few-shot fashion. Preliminary testing has shown that such an approach often outperforms other fine-tuning approaches. The reason for this upshot is that the model has learned internal representations that capture the multi-faceted nature of a computer network and derive from these representations strong abilities to perform narrower tasks, even if they do not involve explicitly the said facet or modality.

For instance, AI process 249 might use multimodal foundation model 504 to predict a user experience metric (e.g., an application QoE metric) from end-to-end QoS metrics (e.g., path metrics), but internally the model uses representations that have been trained from a much richer dataset, that includes traffic data, device configuration and interface statistics, such that it accounts for potential failure scenarios that are simply not possible to learn strictly from end-to-end QoS metrics.

Figure 6:
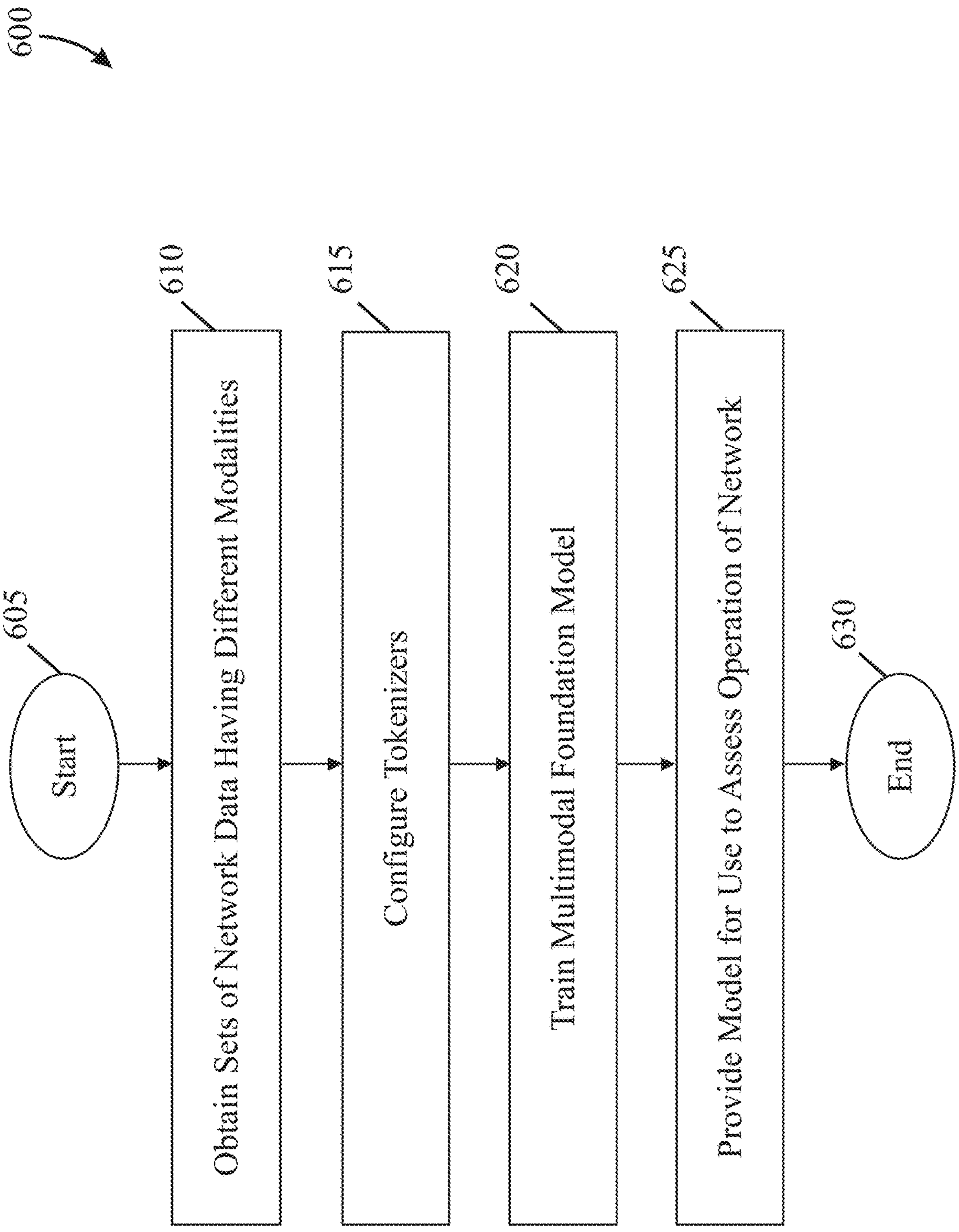
FIG. 6 illustrates an example simplified procedure for using a multimodal foundation model for networking.

FIG. 6 illustrates an example simplified procedure 600 (e.g., a method) for using a multimodal foundation model for networking, in accordance with one or more implementations described herein. For example, a non-generic, specifically configured device (e.g., device 200), such as a router, firewall, controller for a network (e.g., an SDN controller or other device in communication therewith), server, or the like, may perform procedure 900 by executing stored instructions (e.g., AI process 249 and/or network control process 248). The procedure 600 may start at step 605, and continues to step 610, where, as described in greater detail above, the device may obtain sets of network data having different modalities that are generated by a plurality of data sources in a computer network regarding operation of the computer network. In some instances, the sets of network data include a set of one or more images of a topology of the computer network and at least one set of data having a text-based modality. In one implementation, the at least one set of data having the text-based modality comprises at least one of: a set of packet capture data, a set of network traffic statistics, a set of event logs, a set of firewall data, a set of network configurations, or a set of time-series data.

At step 615, as detailed above, the device may configure a plurality of tokenizers to tokenize the sets of network data, each tokenizer being configured for a different one of the different modalities of the sets of network data. In various implementations, the different modalities are standardized in the sets of network data. In some implementations, missing data in the sets of network data is explicitly marked as missing.

At step 620, the device may train, using the plurality of tokenizers, a multimodal foundation model to make a cross-modality prediction, as described in greater detail above. In various implementations, the multimodal foundation model is trained to learn relationships between the sets of network data across the different modalities. In some implementations, the device may also fine-tune at least a portion of the multimodal foundation model for a particular assessment task with respect to the operation of the computer network. In various implementations, the particular assessment task comprises at least one of: network monitoring (e.g., anomaly or intrusion detection, traffic classification, alerting, user experience monitoring, etc.), network control (e.g., network configuration management, predictive maintenance, etc.), or network troubleshooting (e.g., root cause analysis, etc.). In various implementations, the device may train the multimodal foundation model by using self-supervised learning to randomly pick input modalities from amongst the different modalities and a subset of their tokens and to ask the multimodal foundation model to predict one or more output modalities that correspond to those input modalities.

At step 625, as detailed above, the device may provide the multimodal foundation model for use to assess the operation of the computer network. In some implementations, the device may also provide an output of the multimodal foundation model regarding the operation of the computer network to a user interface for presentation to a user.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for using a multimodal foundation model for networking, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

obtaining, by a device, sets of network data having different modalities that are generated by a plurality of data sources in a computer network regarding operation of the computer network;

configuring, by the device, a plurality of tokenizers to tokenize the sets of network data, each tokenizer being configured for a different one of the different modalities of the sets of network data;

training, by the device and using the plurality of tokenizers, a multimodal foundation model to make a cross-modality prediction; and providing, by the device, the multimodal foundation model for use to assess the operation of the computer network.

2. The method as in claim 1, wherein the multimodal foundation model is trained to learn relationships between the sets of network data across the different modalities.

3. The method as in claim 1, wherein the sets of network data include a set of one or more images of a topology of the computer network and at least one set of data having a text-based modality.

4. The method as in claim 3, wherein the at least one set of data having the text-based modality comprises at least one of: a set of packet capture data, a set of network traffic statistics, a set of event logs, a set of firewall data, a set of network configurations, or a set of time-series data.

5. The method as in claim 1, further comprising:

fine-tuning at least a portion of the multimodal foundation model for a particular assessment task with respect to the operation of the computer network.

6. The method as in claim 5, wherein the particular assessment task comprises at least one of: network monitoring, network control, or network troubleshooting.

7. The method as in claim 1, wherein training the multimodal foundation model comprises:

using self-supervised learning to randomly pick input modalities from amongst the different modalities and a subset of their tokens and to ask the multimodal foundation model to predict one or more output modalities that correspond to those input modalities.

8. The method as in claim 1, wherein the different modalities are standardized in the sets of network data.

9. The method as in claim 1, further comprising:

providing, by the device, an output of the multimodal foundation model regarding the operation of the computer network to a user interface for presentation to a user.

10. The method as in claim 1, wherein missing data in the sets of network data is explicitly marked as missing.

11. An apparatus, comprising:

one or more network interfaces;

a processor coupled to the one or more network interfaces and configured to execute one or more processes; and a memory configured to store a process that is executable by the processor, the process when executed configured to:

obtain sets of network data having different modalities that are generated by a plurality of data sources in a computer network regarding operation of the computer network;

configure a plurality of tokenizers to tokenize the sets of network data, each tokenizer being configured for a different one of the different modalities of the sets of network data;

train, using the plurality of tokenizers, a multimodal foundation model to make a cross-modality prediction; and provide the multimodal foundation model for use to assess the operation of the computer network.

12. The apparatus as in claim 11, wherein the multimodal foundation model is trained to learn relationships between the sets of network data across the different modalities.

13. The apparatus as in claim 11, wherein the sets of network data include a set of one or more images of a topology of the computer network and at least one set of data having a text-based modality.

14. The apparatus as in claim 13, wherein the at least one set of data having the text-based modality comprises at least one of: a set of packet capture data, a set of network traffic statistics, a set of event logs, a set of firewall data, a set of network configurations, or a set of time-series data.

15. The apparatus as in claim 11, wherein the process when executed is further configured to:

fine-tune at least a portion of the multimodal foundation model for a particular assessment task with respect to the operation of the computer network.

16. The apparatus as in claim 15, wherein the particular assessment task comprises at least one of: network monitoring, network control, or network troubleshooting.

17. The apparatus as in claim 11, wherein the apparatus trains the multimodal foundation model by:

using self-supervised learning to randomly pick input modalities from amongst the different modalities and a subset of their tokens and to ask the multimodal foundation model to predict one or more output modalities that correspond to those input modalities.

18. The apparatus as in claim 11, wherein the different modalities are standardized in the sets of network data.

19. The apparatus as in claim 11, wherein the process when executed is further configured to:

provide an output of the multimodal foundation model regarding the operation of the computer network to a user interface for presentation to a user.

20. A tangible, non-transitory, computer-readable medium storing program instructions that cause a device to execute a process comprising:

obtaining, by the device, sets of network data having different modalities that are generated by a plurality of data sources in a computer network regarding operation of the computer network;

configuring, by the device, a plurality of tokenizers to tokenize the sets of network data, each tokenizer being configured for a different one of the different modalities of the sets of network data;

training, by the device and using the plurality of tokenizers, a multimodal foundation model to make a cross-modality prediction; and providing, by the device, the multimodal foundation model for use to assess the operation of the computer network.

* * * * *